(12) United States Patent
Michels et al.

(10) Patent No.: US 9,080,045 B2
(45) Date of Patent: Jul. 14, 2015

(54) IMPACT MODIFIED POLYCARBONATE COMPOSITIONS

(75) Inventors: Gisbert Michels, Leverkusen (DE); Edgar Leitz, Dormagen (DE); Frank Eisenträger, Köln (DE)

(73) Assignee: Styrolution (Jersey) Limited, Channel Islands (GB)

( * ) Notice: Subject to any disclaimer, the term of this patent is extended or adjusted under 35 U.S.C. 154(b) by 320 days.

(21) Appl. No.: 13/527,980

(22) Filed: Jun. 20, 2012

(65) Prior Publication Data

US 2013/0158183 A1 Jun. 20, 2013

(30) Foreign Application Priority Data

Jun. 20, 2011 (EP) ..................... 11170521

(51) Int. Cl.
| | |
|---|---|
| C08G 64/00 | (2006.01) |
| C08L 69/00 | (2006.01) |
| C08L 55/02 | (2006.01) |
| C08G 63/02 | (2006.01) |
| C08L 25/08 | (2006.01) |
| C08L 25/12 | (2006.01) |
| C08L 51/04 | (2006.01) |

(52) U.S. Cl.
CPC ................. *C08L 69/00* (2013.01); *C08L 55/02* (2013.01); *C08L 25/08* (2013.01); *C08L 25/12* (2013.01); *C08L 51/04* (2013.01)

(58) Field of Classification Search
USPC ............... 428/399, 412, 423.1; 528/196, 198
See application file for complete search history.

(56) References Cited

U.S. PATENT DOCUMENTS

| 3,419,634 A | 12/1968 | Vaughn, Jr. | |
|---|---|---|---|
| 3,692,744 A | 9/1972 | Rich et al. | |
| 5,674,940 A | 10/1997 | Eichenauer et al. | |
| 5,733,651 A * | 3/1998 | Wank et al. | 428/339 |
| 2003/0092837 A1 | 5/2003 | Eichenauer | |
| 2009/0281216 A1 | 11/2009 | Avtomonov et al. | |

FOREIGN PATENT DOCUMENTS

| DE | 1495626 A1 | 11/1939 |
|---|---|---|
| DE | 1900270 A1 | 11/1969 |
| DE | 2232877 A1 | 1/1974 |
| DE | 2407647 A1 | 9/1974 |
| DE | 2407776 A1 | 9/1975 |
| DE | 2703376 A1 | 8/1977 |
| DE | 2714544 A1 | 10/1977 |
| DE | 2715932 A1 | 10/1978 |
| DE | 2842005 A1 | 4/1980 |
| DE | 3000610 A1 | 7/1980 |
| DE | 2940024 A1 | 4/1981 |
| DE | 3334782 A1 | 10/1984 |
| DE | 3639904 A1 | 6/1988 |
| DE | 3832396 A1 | 2/1990 |
| DE | 3913509 A1 | 10/1990 |
| DE | 19639821 A1 | 4/1998 |
| DE | 3007934 A1 | 2/2013 |
| EP | 704488 A1 | 4/1996 |
| EP | 768157 A1 | 4/1997 |
| EP | 867463 A1 | 9/1998 |
| WO | 0162812 A1 | 8/2001 |
| WO | 2011062848 A1 | 5/2011 |
| WO | 2011062850 A2 | 5/2011 |
| WO | 2011066640 A1 | 6/2011 |

OTHER PUBLICATIONS

Schnell, "Chemistry and Physics of Polycarbonates," Interscience Publishers, 1964, pp. 9-76.
Kunststoff-Hanbuch, vol. VIII, Carl Hanser Verlag, Munich 1973, pp. 695 ff.
Scholtan, W. and Lange, H.: Kolloid Z. u. Z. Polymere 250, (1972), pp. 782-796.
Lagaly, G., Schulz, O. and Ziemehl, R., "Dispersionen und Emulsionen: Eine Einführung in die Kolloidik feinverteilter, Stoffe einschließlich der tonminerale, Darmstadt," Steinkopf-Verlag 1997, ISBN 3-7985-1087-3, p. 282, formula 8.3b.
Houben-Weyl: Methoden der Organischen Chemie, Makromolekulare Stoffe, part 1, Thieme Verlag Stuttgart (1961) p. 307.
Houben-Weyl: Methoden der Organischen Chemie, vol. 14/1, pp. 263-297.

* cited by examiner

*Primary Examiner* — Terressa Boykin
(74) *Attorney, Agent, or Firm* — Dilworth & Barrese, LLP

(57) ABSTRACT

The invention relates to thermoplastic polycarbonate compositions which are impact-modified with ABS type polymers, said polycarbonate compositions being impact-modified with ABS type polymers are characterized by their excellent low temperature ductility, good processing properties expressed by relatively high melt volume rate (MVR) and good hydrolytic stability.

22 Claims, No Drawings

IMPACT MODIFIED POLYCARBONATE COMPOSITIONS

BACKGROUND OF THE INVENTION

The invention relates to thermoplastic polycarbonate compositions which are impact-modified with ABS type polymers.

The inventive polycarbonate (PC) compositions which are impact-modified with ABS type polymers are characterized by their excellent low temperature ductility, good processing properties expressed by relatively high melt volume rate (MVR) and good hydrolytic stability. Impact-modified polycarbonate compositions., e.g. those blends with ABS (acrylonitrile-butadiene-styrene polymer), are known for their high ductility at room temperature and low temperatures and good processing properties. However, for realization of demanding uses, in particular complex component geometries, it is often desirable to improve the processing properties further. Conventional measures lead to the desired improvement, however, as a rule cause a deterioration in the toughness. This is critical in view of fact that as high quality requirements of ductility, in some cases down to low temperatures, are as a rule imposed on components of PC/ABS, e.g. safety parts in automobile construction.

From EP 0 704 488 B1 PC/ABS moulding compositions are known with graft polymers which are based on a rubber polymer latex which has a weight median average particle diameter $D_{50}$ from 0.20 to 0.35 µm. For using rubber polymer latices outside this range it is reported that especially the low temperature impact is significantly reduced.

From WO 01/62812 A1 the following composition is known. The composition contains two graft polymers and one thermoplastic polymer which can be described shortly as:

first graft of styrene and acrylonitrile monomers onto a first rubber latex with a $D_{50}$ diameter of 80 to 228 nm whereby this rubber latex is provided by seed feed emulsion polymerization using a seed with diameter of 10 to 100 nm second craft of styrene and acrylonitrile monomers onto a second rubber latex with a $D_{50}$ diameter of 340 to 480 nm whereby this rubber is provided by seed feed emulsion polymerization using as seed the first rubber latex rubber-free copolymer from styrene and acrylonitrile.

It is reported that the grafts can be polymerized separately or can be produced in a common grafting of a mixture of the two rubber latices but from the examples only grafts are known which are polymerized separately. WO 01/62812 A1 mentions a number of thermoplastics resin, that can be used in addition to the styrene-acrylonitrile copolymer, including polycarbonate. However there are no specific examples of PC/ABS blends and thus it is also not taught in this document whether this composition would have beneficial results in PC/ABS blends. Moreover none of the examples has the parameters of the butadiene latices as used in the present invention.

Similarly from WO 01/62850 A1 compositions are known which are taught also to be suitable for PC/ABS compositions, The compositions contain a graft polymer onto a mixture of three rubber latices and a thermoplastic polymer which can be described shortly as:

graft polymer of styrene and acrylonitrile monomer onto a mixture of three rubber latices first rubber latex with a $D_{50}$ diameter of ≤250 nm and a gel content of 30 to 95% second rubber latex with a $D_{50}$ diameter of >250 nm to 350 nm and a gel content of 30 to 80% third rubber latex with a $D_{50}$ diameter of >350 nm and a gel content of 50 to 95% whereby at least one of the rubber latices is produced by seed feed emulsion polymerization rubber-free copolymer from styrene and acrylonitrile.

It is not taught that this composition would have beneficial results in PC/ABS blends. Again there are no specific examples of a PC/ABS composition nor do any of the examples meet the features of present invention.

Similarly from WO 01/62848 A1 compositions are known which are claimed also to be suitable for PC/ABS compositions. The compositions contain at least two graft polymers onto rubber latices and one thermoplastic polymer which can be described shortly as:

a first graft polymer of styrene and acrylonitrile monomers onto a first rubber latex with a $D_{50}$ diameter of 230 to 330 nm whereby the third rubber latex is used as seed in the emulsion polymerization of the first rubber latex, a second graft polymer of styrene and acrylonitrile monomers onto a second rubber latex with a $D_{50}$ diameter of 340 to 480 nm whereby the third rubber latex is used as seed in the emulsion polymerization of the second rubber latex, and optionally a third graft polymer of styrene and acrylonitrile monomers onto a third rubber latex with a $D_{50}$ diameter of 10 to 220 nm, rubber-free copolymer from styrene and acrylonitrile, It is reported that the grafts can be polymerized separately or can be produced in a common grafting of a mixture of the two or three rubber latices but from the trials only grafts are known in which the first and second rubber latices are mixed and then grafted together and the third rubber latex with a $D_{50}$ diameter is grafted separately. WO 01/62848 A1 mentions a number of thermoplastics resin, that can be used in addition to the styrene-acrylonitrile copolymer, including polycarbonate. However, there are no specific examples of PC/ABS blends and thus it is also not taught in this document whether this composition would have beneficial results in PC/ABS blends. Moreover none of the examples has the parameters of the butadiene latices as used in the present invention.

From WO 01/66840 A1 PC/ABS compounds are known comprising the following components:

polycarbonate with styrene and acrylonitrile grafted rubber based on at least two rubber latices whereas the first rubber latex has a diameter $D_{50}$≤350 nm, preferably 260 to 310 nm, specifically 277 nm, and an gel content ≤70 wt.-% and the second rubber latex has a diameter $D_{50}$≥350 nm and an gel content ≥70 wt.-% rubber-free copolymer from styrene and acrylonitrile.

Examples show that there is an improvement in properties like impact strength and elongation at break when a mixture of the above named rubbers are used compared to only one rubber latex with a diameter $D_{50}$<350 nm. However, no data are submitted as to low temperature impact strength, and it seems also that there is still a lack in low temperature ductility. Accordingly low temperature properties still need to be improved, in particular, the balance of the properties like impact strength and ductility at low temperature is still to be improved.

From DE 196 39 821 A1 PC/ABS compounds are known which comprises the following components:
polycarbonate
with styrene and acrylonitrile grafted rubber based on at least one ore more rubber latices whereas at the most 70 wt.-% of the rubber particles have a diameter larger than 180 nm.
rubber-free copolymer from styrene and acrylonitrile or polyalkylene terephthalate.

Examples show some improvements are visible with the filling pressure but it seems that there is still a lack in low temperature ductility.

Therefore, there is still room for improving the mechanical properties of PC/ABS compositions especially low temperature ductility, a good MVR and a good hydrolytic stability.

SUMMARY OF THE INVENTION

Surprisingly it was found that special graft rubber polymers based on a mixture of at least two rubber latices with a special particle size and special gel content in a specific ratio result in the desired improved PC/ABB properties.

Accordingly the present invention provides a resin composition comprising:
A) 5 to 99 wt.-parts of at least one aromatic polycarbonate,
B) 1 to 95 wt.-parts of at least one graft rubber copolymer which is obtained by:
emulsion polymerization of styrene and acrylonitrile in the weight ratio 95:5 to 50:50, whereby styrene and/or acrylonitrile wholly or partially can be replaced by copolymerizable monomers, onto at least two rubber latices, comprising:
a butadiene rubber latex (B1) having a weight median particle diameter $D_{50}$ of 100 to 250 nm, and a gel content from 30 to 80% by weight (wt), and
a butadiene rubber latex (B2) having a weight median particle diameter $D_{50}$ of more than 350 nm, and a gel content of less than 75% by weight,
C) optionally 0 to 50 wt.-parts of one or more (co)polymer of at least one monomer selected from the group consisting of vinyl aromatic monomers, vinyl cyanides and unsaturated carboxylic acids and derivatives thereof,
D) optionally 0 to 25 wt.-parts of conventional polymer additives,
wherein the weight median particle diameter $D_{50}$ of the mixture of the butadiene rubber latices (B1) and (B2) is larger than 350 nm and is less than 1000 nm, and the amount of the butadiene rubber latex polymer (B1) in the graft rubber copolymer B) is 1 to 49% by weight (B1) and the amount of the butadiene rubber latex polymer (B2) is 51 to 99% by weight, based on the total weight of the rubber latex polymers in the graft rubber copolymer B).

DESCRIPTION OF THE PREFERRED EMBODIMENTS

The resin composition according to the present invention preferably comprises:
A) 5 to 95 wt.-parts, preferably 10 to 90 wt.-parts, most preferably 20 to 80 wt.-parts aromatic polycarbonate,
B) 1 to 50 wt.-parts, preferably 2 to 40 wt.-parts, most preferably 3 to 30 wt.-parts of at least one grafted rubber, which is obtained by emulsion polymerization of styrene and acrylonitrile in the weight ratios 95:5 to 50:50 whereby styrene and/or acrylonitrile wholly or partially can be replaced by copolymerizable monomers, preferably by alpha-methylstyrene, methyl methacrylate, maleic anhydride or N-phenylmaleimide onto at least two rubber latices whereas the butadiene rubber latex (B1) has a weight median particle diameter $D_{50}$ of 100 to 250 nm, preferably 100 to 220 nm and particular preferably 150 to less than 200 nm and a gel content from 30 to 80% by wt., preferably 40 to 75% by wt., particular preferably 45 to 75% by wt. preferably 60 to 80% by wt. more preferably 60 to 75% by wt., and the butadiene rubber latex (B2) has a weight median particle diameter $D_{50}$ of more than 350 nm, preferably 350 to 1000 nm, preferably 350 to 800 nm and particular preferably 360 to 500 nm and a gel content of less than 75% by wt., preferably less than 70% by wt., preferably 40 to less than 70% by wt., particular preferably 45 to less than 70% by wt.

C) 0 to 50 wt.-parts of a (co)polymers of at least one monomer from the group consisting of vinyl aromatic monomers, vinyl cyanides (unsaturated nitrites), unsaturated carboxylic acids and derivatives thereof, such as (meth)acrylic acid ($C_1$ to $C_8$)-alkyl esters, unsaturated carboxylic acids, e.g. anhydrides and imides of unsaturated carboxylic acids, D) 0.5 to 25 wt.-parts of conventional polymer additives, preferably 0.5 to 5 wt.-parts, most preferably 0.5 to less than 1 wt.-parts, In a preferred embodiment the indication wt.-parts (weight parts) represent wt.-%, based on the total weight of the resin composition, i.e. in a preferred embodiment the resin composition comprises:

A) 5 to 99 wt.-% of at least one aromatic polycarbonate,
B) 1 to 95 wt.-% of at least one graft rubber copolymer, as defined before:
emulsion polymerization of styrene and acrylonitrile in the weight ratio 95:5 to 50:50, whereby styrene
C) optionally 0 to 50 wt.-% of one or more (co)polymer as defined before, and
D) optionally 0 to 25 wt.-% of conventional polymer additives,
the weight-percentages being based on the total weight of the resin composition.

In a preferred embodiment the resin composition of the invention comprises:
A) 30 to 80 wt.-% of at least one aromatic polycarbonate,
B) 5 to 30 wt.-% of at least one graft rubber copolymer, and
C) 10 to 40 wt.-% of one or more (co)polymer, and
optionally 0 to 25 wt.-% of conventional polymer additives D),
each as defined before and the weight-percentages being based on the total weight of the resin composition.

In a preferred embodiment the resin composition consists only of the components A) to D).

The weight median particle diameter $D_{50}$ of the mixture of the butadiene rubber latices (B1) and (B2) is larger than 350 nm, preferably larger than 355 nm and particularly preferably larger than 360 nm and the weight median particle diameter $D_{50}$, of the mixture of the butadiene rubber latices (B1) and (B2) is less than 1000 nm, preferably less than 800 nm, most preferably less than 500 nm and the amount of the butadiene rubber latex polymer (B1) in the graft polymer B is 1 to 49% by wt. (B1) and the amount of the butadiene rubber latex polymer (B2) is 51 to 99% by wt., and the amount of the butadiene rubber latex polymer (B1) in the graft polymer B is preferably 10 to 40% by wt, (B1) and the amount of the butadiene rubber latex polymer (52) is preferably 60 to 90% by wt. and the amount of the butadiene rubber latex polymer (B1) in the graft polymer B is particularly preferably 15 to 35% by wt. (B1) and the amount of the butadiene rubber latex polymer (52) is particularly preferably 65 to 85% by wt based on the total weight of the rubber latex polymers in the graft rubber copolymer B).

Component A) (Aromatic Polycarbonate)

Component A) includes one or more, preferably one or two, more preferably one aromatic polycarbonate.

Component A) includes for example polycondensation products, for example aromatic polycarbonates, aromatic polyester carbonates.

Aromatic polycarbonates and/or aromatic polyester carbonates according to component A) which are suitable according to the invention are known from the literature or may be prepared by processes known from the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610 and DE-A 3 832 396; for the preparation of aromatic polyester carbonates e.g. DE-A 3 077 934). The preparation of aromatic polycarbonates is carried out e.g. by reaction of diphenols with carbonic acid halides, preferably phosgene, and/or with aromatic dicarboxylic acid dihalides, preferably benzenedicarboxylic acid dihalides, by the phase interface process, optionally using chain terminators, for example monophenols, and optionally using branching agents which are trifunctional or more than trifunctional, for example triphenols or tetraphenols. A preparation via a melt polymerization process by reaction of diphenols with, for example, diphenyl carbonate is also possible.

Diphenols for the preparation of the aromatic polycarbonates and/or aromatic polyester carbonates are preferably those of the formula (I)

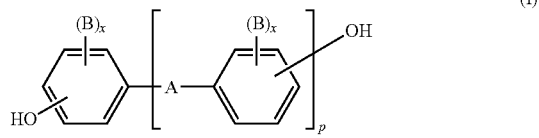

(I)

wherein

A is a single bond, $C_1$ to $C_5$-alkylene, $C_2$ to $C_5$-alkylidene, $C_5$ to $C_6$-cycloalkylidene, —O—, —SO—, —CO—, —S—, —SO_2—, $C_6$ to $C_{12}$-arylene, on to which further aromatic rings optionally containing heteroatoms may be fused, or a radical of the formula (II) or (III),

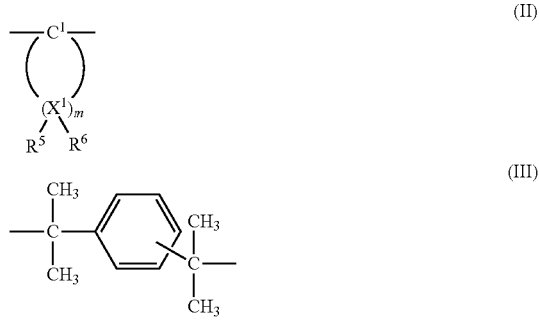

B in each case is $C_1$ to $C_{12}$-alkyl, preferably methyl, or halogen, preferably chlorine and/or bromine, x in each case independently of one another, is 0, 1 or 2, p is 1 or 0 and $R^5$ and $R_6$ individually for each $X^1$ and independently of one another denote hydrogen or $C_1$ to $C_6$-alkyl, preferably hydrogen, methyl or ethyl, $X^1$ denotes carbon and m denotes an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl)sulfoxides, bis-(hydroxyphenyl) ketones, bis-(hydroxyphenyl)sulfones and α,α-bis-(hydroxyphenyl)-diisopropyl-benzenes and nucleus-brominated and/or nucleus-chlorinated derivatives thereof. Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetra-brominated or chlorinated derivatives thereof, such as, for example, 2,2-bis-(3-chloro-4-hydroxyphenyl)-propane, 2,2-bis-(3,5-dichloro-4-hydroxyphenyl)-propane ear 2,2-bis-(3,5-dibromo-4-hydroxyphenyl)-propane. 2,2-bis-(4-hydroxyphenyl)-propane (bisphenol A) is particularly preferred. The diphenols may be employed individually or as any desired mixtures. The diphenols are known from the literature or obtainable by processes known from the literature.

Chain terminators which are suitable for the preparation of the thermoplastic, aromatic polycarbonates are, for example, phenol, p-chlorophenol, p-tert-butylphenol or 2,4,6-tribromophenol, and also long-chain alkylphenols, such as 4-[2-(2,4,4-trimethylpentyl)]-phenol, 4-(1,3-tetramethylbutyl)-phenol according to DE-A 2 842 005 or monoalkylphenols or dialkylphenols having a total of 8 to 20 carbon atoms in the alkyl substituents, such as 3,5-di-tert-butylphenol, p-iso-octylphenol, p-tert-octylphenol, p-dodecylphenol and 2-(3,5-dimethylheptyl)-phenol and 4-(3,5-dimethylheptyl)-phenol. The amount of chain terminators to be employed is in general between 0.5 mol % and 10 mol %, based on the sum of the moles of the particular diphenols employed.

The thermoplastic, aromatic polycarbonates have average weight-average molecular weights ($M_w$, measured e.g. by ultracentrifuge or scattered light measurement) of from 10,000 to 200,000 g/mol, preferably 15,000 to 80,000 g/mol, particularly preferably 24,000 to 32,000 g/mol. The thermoplastic, aromatic polycarbonates may be branched in a known manner, and in particular preferably by incorporation of from 0.05 to 2.0 mol %, based on the sum of the diphenols employed, of compounds which are trifunctional or more than trifunctional, for example those having three and more phenolic groups. Both homopolycarbonates and copolycarbonates are suitable. It is also possible for 1 to 25 wt. %, preferably 2.5 to 25 wt. %, based on the total amount of diphenols to be employed, of polydiorganosiloxanes having hydroxyaryloxy end groups to be employed for the preparation of copolycarbonates according to the invention according to component A. These are known (U.S. Pat. No. 3,419,634) and may be prepared by processes known from the literature. The preparation of copolycarbonates containing polydiorganosiloxanes is described in DE-A 3 334 782. Preferred polycarbonates are, in addition to the bisphenol A homopolycarbonates, the copolycarbonates of bisphenol A with up to 15 mol %, based on the sum of the moles of diphenols, of other diphenols mentioned as preferred or particularly preferred, in particular 2,2-bis-(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether-4,4'-dicarboxylic acid and of naphthalene-2,6-dicarboxylic acid. Mixtures of the diacid dichlorides of isophthalic acid and of terephthalic acid in a ratio of between 1:20 and 20:1 are particularly preferred. A carbonic acid halide, preferably phosgene, is additionally co-used as a bifunctional acid derivative in the preparation of polyester carbonates. Possible chain terminators for the preparation of the aromatic polyester carbonates are, in addition to the monophenols already mentioned, also chlorocarbonic acid esters thereof as well as the acid chlorides of aromatic monocarboxylic acids, which may optionally be substituted by $C_1$ to $C_{22}$ alkyl groups or by halogen atoms, as well as aliphatic $C_2$ to $C_{22}$-monocarboxylic acid chlorides. The amount of chain terminators is in each case 0.1 to 10 mol %, based on the moles of diphenol in the case of the phenolic chain terminators and on the moles of dicarboxylic acid dichloride in the case of monocarboxylic acid chloride chain terminators. The aromatic polyester carbonates may also contain incorporated aromatic hydroxycarboxylic acids.

The aromatic polyester carbonates may be either linear or branched in a known manner (in this context see DE-A 2 940 024 and DE-A 3 007 934). Branching agents which may be used are, for example, carboxylic acid chlorides which are trifunctional or more than trifunctional, such as trimesic acid trichloride, cyanuric acid trichloride, 3,3',4,4'-benzophenone-tetracarboxylic acid tetrachloride, 1,4,5,8-naphthalene-tetracarboxylic acid tetrachloride or pyromellitic acid tetrachloride, in amounts of from 0.01 to 1.0 mol % (based on the dicarboxylic acid dichlorides employed), or phenols which are trifunctional or more than trifunctional, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane and 1,4-bis-[4,4'-dihydroxytriphenyl)-methyl]-benzene, in amounts of from 0.01 to 1.0 mol %, based on the diphenols employed. Phenolic branching agents may be initially introduced into the reaction vessel with the diphenols, and acid chloride branching agents may be introduced together with the acid dichlorldes.

The content of carbonate structural units in the thermoplastic, aromatic polyester carbonates may be varied as desired. Preferably, the content of carbonate groups is up to 100 mol %, in particular up to 80 mol %, particularly preferably up to 50 mol %, based on the sum of ester groups and carbonate groups. Both the ester and the carbonate content of the aromatic polyester carbonates may be present in the polycondensate in the form of blocks or in random distribution.

The relative solution viscosity ($\eta_{rel}$) of the aromatic polycarbonates and polyester carbonates is in the range of 1.18 to 1.4, preferably 1.20 to 1.32 (measured on solutions of 0.5 g polycarbonate or polyester carbonate in 100 ml methylene chloride solution at 25° C.). The thermoplastic, aromatic polycarbonates and polyester carbonates may be employed by themselves or in any desired mixture of one or more, preferably one to three or one or two thereof. Most preferably only one type of polycarbonate is used.

Most preferably the aromatic polycarbonate is a polycarbonate based on bisphenol A and phosgene, which includes polycarbonates that have been prepared from corresponding precursors or synthetic building blocks of bisphenol A and phosgene. These preferred aromatic polycarbonates may be linear or branched due to the presence of branching sites.

It is possible according to the present invention that the resin composition may include other thermoplastic resins like polyesters or polyamides in particular in an amount of up to 20 weight-% of the total weight of the resin composition.

Suitable thermoplastic polyesters are preferably polyalkylene terephthalates, that is to say reaction products of aromatic dicarboxylic acids or reactive derivatives thereof (e.g. dimethyl esters or anhydrides) and aliphatic, cycloaliphatic or arylaliphatic dials, and mixtures of such reaction products. Preferred polyalkylene terephthalates may be prepared from terephthalic acids (or reactive derivatives thereof) and aliphatic or cycloaliphatic diols having from 2 to 10 carbon atoms according to known methods (Kunststoff-Handbuch, Volume VIII, p. 695 ff, Carl Hanser Verlag, Munich 1973).

In preferred polyalkylene terephthalates, from 80 to 100 mol %, preferably from 90 to 100 mol %, of the dicarboxylic acid radicals are terephthalic acid radicals, and from 80 to 100 mol %, preferably from 90 to 100 mol %, of the diol radicals are ethylene glycol and/or 1,4-butanediol radicals. The preferred polyalkylene terephthalates may contain, in addition to ethylene glycol or 1,4-butanediol radicals, from 0 to 20 mol % of radicals of other aliphatic diols having from 3 to 12 carbon atoms or cycloaliphatic diols having from 6 to 12 carbon atoms, for example radicals of 1,3-propanediol, 2-ethyl-1,3-propanediol, neopentyl glycol, 1,5-pentanediol, 1,6-hexanediol, 1,4-cyclohexanedimethanol, 3-methyl-1,3- and -1,6-pentanediol, 2-ethyl-1,3-hexanediol, 2,2-diethyl-1,3-propanediol, 2,5-hexanediol, 1,4-di(β-hydroxyethoxy)benzene, 2,2(bis-4-hydroxycyclohexyl)-propane, 2,4-dihydroxy-1,1,3,3-tetramethylcyclobutane, 2,2-bis-(3-β-hydroxyethoxyphenyl)-propane and 2,2-bis-(4-hydroxypropoxyphenyl)-propane (DE-A 2 407 647, 2 407 776, 2 715 932).

The polyalkylene terephthalates may be branched by incorporation of relatively small amounts of tri- or tetra-hydric alcohols or tri- or tetra-basic carboxylic acids, such as are described in DE-A 1 900 270 and U.S. Pat. No. 3,692,744. Examples of preferred branching agents are trimesic acid, trimellitic acid, trimethylol-ethane and -propane and pentaerythritol. It is advisable to use not more than 1 mol % of the branching agent, based on the acid component. Particular preference is given to polyalkylene terephthalates that have been prepared solely from terephthalic acid and reactive derivatives thereof (e.g. dialkyl esters thereof) and ethylene glycol and/or 1,4-butanediol, and mixtures of such polyalkylene terephthalates.

Preferred polyalkylene terephthalates are also copolyesters prepared from at least two of the above-mentioned alcohol components: particularly preferred copolyesters are poly-(ethylene glycol 1,4-butanediol) terephthalates, The polyalkylene terephthalates that are preferably suitable generally have an intrinsic viscosity of from 0.4 to 1.5 dL/g, preferably from 0.5 to 1.3 dL/g, especially from 0.6 to 1.2 dL/g, in each case measured in phenol/o-dichlorobenzene (1:1 parts by weight) at 25° C.

Suitable polyamides are known homopolyamides, copolyamides and mixtures of such polyamides. They may be semi-crystalline and/or amorphous polyamides.

Suitable semi-crystalline polyamides are polyamide-6, polyamide-6,6, mixtures and corresponding copolymers of those components. Also included are semi-crystalline polyamides the acid component of which consists wholly or partially of terephthalic acid and/or isophthalic acid and/or suberic acid and/or sebacic acid and/or azelaic acid and/or adipic acid and/or cyclohexanedicarboxylic acid, the diamine component of which consists wholly or partially m- and/or p-xylylene-diamine and/or hexamethylenediamine and/or 2,2,4-trimethylhexamethylenediamine and/or 2,2,4-trimethylhexamethylenediamine and/or isophoronediamine, and the composition of which is in principle known. Mention may also be made of polyamides that are prepared wholly or partially from lactams having from 7 to 12 carbon atoms in the ring, optionally with the concomitant use of one or more of the above-mentioned starting components.

Particularly preferred semi-crystalline polyamides are polyamide-6 and polyamide-6,6 and mixtures thereof. Known products may be used as amorphous polyamides. They are obtained by polycondensation of diamines, such as ethylenediamine, hexamethylenediamine, decamethylenediamine, 2,2,4- and/or 2,4,4-trimethylhexamethylenediamine, m- and/or p-xylylene-diamine, bis-(4-aminocyclohexyl)-methane, bis-(4-aminocyclohexyl)-propane, 3,3'-dimethyl-4,4'-diamino-dicyclohexylmethane, 3-aminomethyl-3,5,5-trimethylcyclohexylamine, 2,5- and/or 2,6-bis-(aminomethyl)-norbornane and/or 1,4-diaminomethylcyclohexane, with dicarboxylic acids such as oxalic acid, adipic acid, azelaic acid, azelaic acid, decanedicarboxylic acid, heptadecanedicarboxylic acid, 2,2,4- and/or 2,4,4-trimethyladipic acid, isophthalic acid and terephthalic acid. Also suitable are copolymers obtained by polycondensation of a plurality of monomers, as well as copolymers prepared with the addition of aminocarboxylic acids such as ε-aminocaproic acid, ω-aminoundecanoic acid or ω-aminolauric acid or their lactams. Particularly suitable amorphous polyamides are the polyamides prepared from isophthalic acid, hexamethylenediamine and further diamines such as 4,4'-diaminodicyclohexylmethane, isophoronediamine, 2,2,4- and/or 2,4,4-trimethylhexamethylenediamine, 2,5- and/or 2,6-bis-(aminomethyl)-norbornene; or from isophthalic acid, 4,4'-diamino-dicyclohexylmethane and ε-caprolactam; or from isophthalic acid, 3,3'-dimethyl-4,4'-diamino-dicyclohexylmethane and laurinlactam; or from terephthalic acid and the isomeric mixture of 2,2,4- and/or 2,4,4-trimethylhexamethylenediamine. Instead of pure 4,4'-diaminodicyclohexylmethane it is also possible to use mixtures of the position-isomeric diaminodicyclohexylmethanes, which are composed of from 70 to 99 mol % of the 4,4'-diamino isomer, from 1 to 30 mol % of the 2,4'-diamino isomer, from 0 to 2 mol % of the 2,2'-diamino isomer and optionally corresponding to more highly condensed diamines, which are obtained by hydrogenation of industrial grade diaminodiphenylmethane. Up to 30% of the isophthalic acid may be replaced by terephthalic acid.

The polyamides preferably have a relative viscosity (measured on a 1 wt. % solution in m-cresol or 1% (weight/volume) solution in 96 wt. % sulfuric acid at 25° C.) of from 2.0 to 5.0, particularly preferably from 2.5 to 4.0.

Component B) (Graft Rubber Copolymer)

Butadiene Rubber Latices (B1) and (B2)

The butadiene rubber latices (B1) and (B2) used to prepare the graft rubber copolymer component B) are preferably produced using the emulsion polymerization of butadiene monomer according to the so-called seed-feed technology whereby first a small sized rubber latex, preferably a butadiene rubber latex, is produced and subsequently the particle size is increased by polymerization and by increasing the monomer conversion of butadiene or monomer mixtures containing butadiene (see e.g. Houben-Weyl, Methoden der organischen Chemie, Makromolekulare Stoffe Teil 1, S. 339 (1961) Thieme Verlag Stuttgart). Preferably a seed-batch or a seed-feed process is used.

Up to 50% by wt. (based on the total amount of monomers used for the production of polybutadiene polymers) of one or more monomers that are copolymerizable with butadiene can be used as comonomers. Examples for such monomers include isoprene, chloroprene, acrylonitrile, styrene, alpha-methylstyrene, $C_1$-$C_4$-alkylstyrenes, $C_1$-$C_8$-alkylacrylates, $C_1$-$C_8$-alkylmethacrylates, alkyleneglycol diacrylates, alkylenglycol dimethacrylates, divinylbenzol; preferably, butadiene is used alone or mixed with up to 20% by wt., preferably 15% by wt. styrene and/or acrylonitrile. Preferred butadiene rubber latex polymers (B1) and (B2) are polybutadiene and butadiene-styrene copolymers.

As seed latex polymers preferrently butadiene polymers are used, e.g. polybutadiene, butadiene-styrene copolymers, butadiene-acrylonitrile polymers or polymers from the above mentioned monomers. In principal other small sized latices can be used, e.g. polystyrene or styrene copolymers, polymethylmethacrylate or methacrylate copolymers or polymerisates from other vinylic monomers. Preferred seed latex polymers are polybutadiene latices.

For the production of the butadiene rubber latices (B1) preferably a seed latex with a weight median particle diameter $D_{50}$ of 10 to 60 nm, preferably of 20 to 50 nm is used. For the production of the butadiene rubber latices (B2) preferably a seed latex with a weight median particle diameter $D_{50}$ of 10 to 220 nm, preferably 20 to 210 nm and most particularly preferably 30 to 200 nm is used.

The butadiene rubber latex (B1) has a weight median particle diameter $D_{50}$ of 100 to 250 nm, preferably 100 to 220 nm and particular preferably 150 to less than 200 nm. The gel content has values from 30 to 80% by preferably 40 to 75% by wt., particular preferably 45 to 75% by wt.

The butadiene rubber latex (B2) has a weight median particle diameter D of more than 350 nm, preferably more than 350 to 1000 nm, preferably 350 to 800 nm and particular preferably 360 to 500 nm. The gel content has values of less than 75% by weight, preferably less than 70% by wt., preferably 40 to less than 70% by wt., particular preferably 45 to less than 70% by wt.

The determination of the weight median particle diameter $D_{50}$ can be carded out by a measurement with an ultracentrifuge (see W. Scholtan, H. Lange; Kolloid Z. u. Z. Polymere 250, pp. 782 to 796(1972)) or a disc centrifuge DC 24000 by CPS Instruments Inc. at a rotational speed of the disc of 24,000 r.p.m. The weight median particle size $D_{50}$ is the diameter which divides the population exactly into two equal parts, 50% by wt. of the particles are larger than the median particle size $D_{50}$ and 50% by wt. are smaller. Also the weight average particle size $D_w$ can be calculated from these measurements. For the definition of $D_w$ see: G. Lagaly, O. Schulz, R. Ziemehl: Dispersionen und Emulsionen: eine Einführung in die Kolloidik feinverteilter Stoffe einschließlich der Tonminerale, Darmstadt: Steinkopf-Verlag 1997, ISBN 3-7985-1087-3, page 282, formula 8.3b. The definition of the weight average particle size diameter $D_w$ according to this formula is the following:

$$D_w = \mathrm{sum}(n_i * D_i^4) / \mathrm{sum}(n_i * D_i^3)$$

$n_i$: number of particles with the diameter $D_i$.

The summation is performed from the smallest to largest diameter of the particles size distribution. It should be mentioned that for a particles sire distribution of particles with the same density which is the case for the rubber latices (B1) and (B2) the volume average particle size diameter $D_v$ is equal to the weight average particle size diameter $D_w$. The calculations of the average diameters were performed by means of the Mie theory.

The values indicated for the gel content are based on the determination according to the wire cage method in toluene (see Houben-Weyl, Methoden der Organischen Chemie, Makromolekulare Stoffe, part 1, page 307 (1961) Thieme Verlag Stuttgart). The gel contents of the starting rubber latices can be adjusted in a manner known in principle by applying suitable reaction conditions (e.g., high reaction temperature and/or polymerization up to high conversion as well as, optionally, addition of substances with a cross-linking effect for achieving a high gel content, or, e.g., low reaction temperature and/or termination of the polymerization reaction prior to the occurrence of a cross-linkage that is too comprehensive as well as, optionally, addition of molecular-weight regulators such as, for example n-dodecylmercaptan or tert-dodecylmercaptan for achieving a low gel content).

As emulsifiers there may be used conventional anionic emulsifiers such as alkyl sulfates, alkyl sulfonates, aralkyl sulfonates, soaps of saturated or unsaturated fatty acids as well as resin acid-based emulsifiers or tall resin emulsifiers. It is also possible in principle to use emulsifiers having carboxyl groups (e.g. salts of C10-C18 fatty acids, emulsifiers according to DE-A 36 39 904 and DE-A 39 13 509), Resin acid-based emulsifiers or tall resin emulsifier or emulsifiers according to DE-A 39 13 509 are used preferably. As resin or rosin acid-based emulsifiers, those are being used in particular for the production of the butadiene rubber latices (B1) and (B2) by emulsion polymerization that contain alkaline salts of the rosin acids. Salts of the resin acids are also known as rosin soaps. Examples include alkaline soaps as sodium or potassium salts from disproportionated and/or dehydrated and/or hydrated and/or partially hydrated gum rosin with a content of dehydroabietic acid of at least 30% by wt. and preferably a content of abietic acid of maximally 1% by wt. Furthermore, alkaline soaps as sodium or potassium salts of tall resins or tall oils can be used with a content of dehydroabietic acid of preferably at least 30% by wt., a content of abietic acid of preferably maximally 1% by wt. and a fatty acid content of preferably less than 1% by wt. Mixtures of the aforementioned emulsifiers can also be used for the production of the butadiene rubber latices (B1) and (B2). The use of alkaline soaps as sodium or potassium salts from disproportionated and/or dehydrated and/or hydrated and/or partially hydrated gum rosin with a content of dehydroabietic acid of at least 30% by wt. and a content of abietic acid of maximally 1% by wt. is advantageous.

Suitable molecular-weight regulators for the production of the butadiene rubber latices (B1) and (B2) include, for example, alkylmercaptans, such as n-dodecylmercaptan, tert-dodecylmercaptan, dimeric alpha-methylstyrene and terpinolene.

Inorganic and organic peroxides, e.g. hydrogen peroxide, di-tert-butylperoxide, cumene hydroperoxide, dicyclohexyl-percarbonate, tent-butylhydroperoxide, p-menthanehydroperoxide, azo initiators such as azobisisobutyronitrile, inorganic per-salts such as ammonium, sodium or potassium persulfate, potassium perphosphate, sodium perborate as well as redox systems can be taken into consideration as initiators of the emulsion polymerization of butadiene or a mixture of butadiene and one or more monomers that are copolymerizable with butadiene as above mentioned. Redox systems generally consist of an organic oxidizing agent and a reducing agent, and additional heavy-metal ions can be present in the reaction medium (see Houben-Weyl, Methoden der Organischen Chemie, volume 14/1, pp. 26-297).

Moreover, salts, acids and bases can be used in the emulsion polymerization for producing the butadiene rubber latices. With acids and bases the pH value, with salts the viscosity of the latices is adjusted during the emulsion polymerisation. Examples for acids include sulfuric acid, hydrochloric acid, phosphoric acid; examples for bases include sodium hydroxide solution, potassium hydroxide solution; examples for salts include chlorides, sulfates, phosphates as sodium or potassium salts. The preferred base is sodium hydroxide solution and the preferred salt is tetrasodium pyrophosphate. The pH value of the butadiene rubber latices is between pH 7 and pH 13, preferably between 8 and pH 12, particularly preferably between pH 9 and pH 12.

Polymerization temperature in the preparation of the starting rubber latices is generally 25° C. to 160° C., preferably 40° C. to 90° C., Work can be carried out under the usual temperature control, e.g. isothermally. It is also possible to carry out polymerization in such a way that the temperature difference between the beginning and the end of the reaction is at least 2° C., or at least 5° C., or at least 10° C. starting with a lower temperature.

It is possible to first provide all substances used, i.e. seed latex, water, monomers, emulsifiers, molecular-weight regulators, initiators, bases, acids and salts at the beginning of polymerization. Furthermore, it is also possible to first provide only the seed latex and a part of the substances used at the beginning of the polymerization, and to first provide other substances used only partially, and to feed the remaining part during the polymerization.

After the polymerization is finished the butadiene rubber latices (B1) and (B2) can be cooled down to 50° C. or lower and as far as the monomer conversion is not completed the not reacted monomers, e.g. butadiene can be removed by devolatilization at reduced pressure if necessary.

The solid content of the butadiene rubber latices (B1) and (B2) is preferably 25 to 60% by wt. (evaporation sample at 180° C. for 25 min. in drying cabinet), more preferably 30 to 55% by wt., particularly preferably 35 to 50% by wt. The degree of conversion (calculated from the solid content of a sample and the mass of the substances used) of the monomers used in the emulsion polymerization preferably is larger than 50%, more preferably larger than 60%, particularly preferably larger than 70%, very particularly preferably larger than 80%, in each case based on the sum of monomers. Moreover, the degree or conversion of the monomers used is preferably lower than 99%, more preferably lower than 97%, particularly preferably lower than 96%, very particularly preferably lower than 95%, in each case based on the sum of monomers.

According to the present invention in the preparation of the graft rubber copolymers B) at least two rubber latices, comprising butadiene rubber latices (B1) and (B2) are used. This means that in addition to the butadiene rubber latices (B1) and (B2) other butadiene rubber latices may be used that do not meet the definition of butadiene rubber latices (B1) and (B2). Such additional butadiene rubber latices may be used for example in an amount of up to 20% by weight based on the total amount of all butadiene rubber latices used in the preparation of a graft rubber copolymer B). In a preferred embodiment, however, only the butadiene rubber latices (B1) and (B2) are used in the preparation of a graft rubber copolymer B). Or with other words the rubber latices used to prepare the of graft rubber copolymer B) consist of butadiene rubber latex polymer (B1) and butadiene rubber latex polymer (B2).

Graft Rubber Copolymers B)

The preparation of the graft rubber copolymers B) obtained according to the invention may be carried out, as desired, either by separately grafting the butadiene rubber the butadiene rubber latices (B1) and (B2) and subsequently mixing the graft rubber copolymers B) obtained, or, preferably, however, by common grafting of the butadiene rubber latices (B1) and (B2) and optionally present other butadiene rubber latices during one reaction. The graft polymerization(s) may be carried out according to any desired processes; it/they is/are preferably so carried out that the monomer mixture is added continuously to a mixture of the butadiene rubber latices (B1) and (B2), and polymerization is carried out. Preferred is the common grafting of a mixture of the butadiene rubber latices (B1) and (B2) during one reaction.

For the preferred common grafting of a mixture of the butadiene rubber latices (B1) and (B2) during one reaction the weight median particle diameter $D_{50}$ of the mixture of the butadiene rubber latices (B1) and (B2) is larger than 350 nm, preferably larger than 355 nm and particularly preferably larger than 360 nm. The weight median particle diameter $D_{50}$ of the mixture of the butadiene rubber latices (B1) and (B2) is less than 1000 nm, preferably less than 800 nm, most preferably less than 500 nm.

The amount of the butadiene rubber latex polymer (B1) in the graft polymer B is 1 to 49% by wt. (B1) and the amount of the butadiene rubber latex polymer (B2) is 51 to 99% by wt. The amount of the butadiene rubber latex polymer (B1) in the graft polymer B is preferably 10 to 40% by wt. (B1) and the amount of the butadiene rubber latex polymer (B2) is preferably 60 to 90% by wt. The amount of the butadiene rubber latex polymer (B1) in the graft polymer B is particularly preferably 15 to 35% by wt. (B1) and the amount of the butadiene rubber latex polymer (B2) is particularly preferably 65 to 85% by wt.

Particular monomer/rubber ratios are preferably maintained, and the monomers are added to the rubber in a known manner: In order to produce graft rubber copolymers B) according to the invention preferably from 15 to 60 parts by weight, particularly preferably from 20 to 50 parts by weight, of a mixture of styrene and acrylonitrile, which may optionally contain up to 50 wt. % (based on the total amount of monomers used in the graft polymerization) of one or more comonomers, are polymerized in the presence of preferably from 40 to 85 parts by weight, particularly preferably from 50 to 80 parts by weight (in each case based on solid), of the butadiene rubber latices (B1) or (B2) or of a mixture of butadiene rubber latices (B1) and (B2). The monomers used in the graft polymerization are preferably mixtures of styrene and acrylonitrile in a weight ratio of from 95:5 to 50:50, particularly preferably in a weight ratio of from 80:20 to 65:35, it being possible for styrene and/or acrylonitrile to be replaced wholly or partially, preferably partially, by copolymerizable monomers, preferably by alpha-methylstyrene, methyl methacrylate, maleic anhydride or N-phenylmaleimide. In principle, any desired further copolymerizable vinyl monomer as mentioned before may be used in addition to styrene and acrylonitrile, in amounts of up to preferably approximately 10 wt. % (based on the total amount of monomers that are grafted). Most preferred is the use of solely styrene and acrylonitrile as graft monomers.

Molecular-weight regulators may additionally be used in the graft polymerization, preferably in amounts of from 0.01 to 2 wt. %, particularly preferably in amounts of from 0.05 to 1 wt. % (in each case based on the total amount of monomers in the graft polymerization step). Suitable molecular-weight regulators are, for example, alkylmercaptans, such as n-dodecylmercaptan, tert-dodecylmercaptan, dimeric alpha-methylstyrene, terpinols.

Included as initiators are inorganic and organic peroxides, for example hydrogen peroxide, di-tert-butyl peroxide, cumene hydroperoxide, dicyclohexyl percarbonate, tert-butyl hydroperoxide, p-menthane hydroperoxide, azo initiators such as azobisisobutyronitrile, inorganic per-salts such as ammonium, sodium or potassium persulfate, potassium perphosphate, sodium perborate, as well as redox systems. Redox systems generally consist of an organic oxidising agent and a reducing agent, it being possible for heavy metal ions additionally to be present in the reaction medium (see Houben-Weyl, Methoden der Organischen Chemie. Volume 14/1, p. 263 to 297).

In the grafting step as emulsifier there may be used conventional anionic emulsifiers such as alkyl sulfates, alkyl sulfonates, aralkyl sulfonates, soaps of saturated or unsaturated fatty acids as well as above mentioned resin acid-based emulsifiers or tall resin emulsifiers. It is also possible in principle to use emulsifiers having carboxyl groups (e.g. salts of C10-C18 fatty acids, emulsifiers according to DE-A 36 39 904 and DE-A 39 13 509). Resin acid-based emulsifiers or tall resin emulsifier are used preferably.

The polymerization temperature is generally from 25° C. to 160° C., preferably from 40° C. to 90° C. The operation may be carried out with conventional temperature management, for example isothermally; however, the graft polymerization is preferably carried out in such a manner that the temperature difference between the beginning and the end of the reaction is at least 10° C., preferably at least 15° C. and particularly preferably at least 20° C., starting at lower temperatures.

In order to produce the graft rubber polymers according to the invention, the graft polymerization may preferably be carried out by feeding in the monomers in such a manner that from 55 to 90 wt. %, preferably from 60 to 80 wt. % and particularly preferably from 65 to 75 wt. %, of the total monomers to be used in the graft polymerization are metered in in the first half of the total monomer metering time; the remaining amount of monomers is metered in in the second half of the total monomer metering time. It is also possible to provide first up to 30 wt. % of the total monomers together with the butadiene rubber latices (B1) or (B2) or mixtures of the butadiene rubber latices (B1) and (B2) and to feed the remaining amount of monomers continuously or in the above described manner.

The work-up of the graft rubber polymers is carried out by common procedures, e.g. by coagulation with salts, e.g. magnesium sulfate and/or acids, washing, drying or by spray drying.

Component C)

The composition may optionally comprise, as a further component C) at least one or more (co)polymer of at least one monomer selected from the group consisting of vinyl aromatic monomers, vinyl cyanides and unsaturated carboxylic acids and derivatives thereof, in particular, (co)polymers of at least one monomer from the group consisting of vinyl aromatics, vinyl cyanides (unsaturated nitrites), (meth)acrylic acid ($C_1$ to $C_8$)-alkyl esters, unsaturated carboxylic acids and derivatives (such as anhydrides and imides) of unsaturated carboxylic acids.

(Co)polymers C) which are particularly suitable are those of

C.1 50 to 99 wt. %, preferably 65 to 85 wt. %, particularly preferably 70 to 80 wt. %, based on (co)polymer C), of at least one monomer selected from the group consisting of vinylaromatics (such as, for example, styrene, α-methylstyrene), nucleus-substituted vinylaromatics (such as, for example, p-methylstyrene, p-chlorostyrene) and (meth)acrylic acid ($C_1$-$C_8$)-alkyl esters (such as, for example, methyl methacrylate, n-butyl acrylate, tert-butyl acrylate) and C.2 1 to 50 wt. %, preferably 15 to 35 wt. %, particularly preferably 20 to 30 wt. %, based on (co)polymer C), of at least one monomer selected from the group consisting of vinyl cyanides (such as, for example, unsaturated nitriles, such as acrylonitrile and methacrylonitrile), (meth)acrylic acid ($C_1$-$C_8$)-alkyl esters (such as, for example, methyl methacrylate, n-butyl acrylate, tert-butyl acrylate), unsaturated carboxylic acids and derivatives of unsaturated carboxylic acids (for example maleic anhydride and N-phenyl-maleimide), with the proviso that C.1 differs from C.2.

The (co)polymers C) are normally resinous, thermoplastic, and rubber-free. The copolymer of C.1 styrene and C.2 acrylonitrile is particularly preferred. Such (co)polymers C) are known and may be prepared by free-radical polymerization, in particular by emulsion, suspension, solution or bulk polymerization. The (co)polymers C) preferably have average molecular weights Mw (weight-average, determined by gel permeation chromatography (using in particular polystyrene as a standard) of between 50,000 and 200,000 g/mol, preferably between 80,000 and 200,000 g/mol, particularly preferably between 100,000 and 200,000 g/mol.

As mentioned above such (co)polymers as component C) may be contained in an amount of preferably up to 50 wt.-% based on the total amount of the resin composition.

Component D)

The composition may moreover comprise further conventional polymer additives (component D), such as those selected from the group of stabilizers (for example antioxidants, UV stabilizers, peroxide destroyers), flame retarding or flameproofing agents, flameproofing synergists, antidripping agents (for example compounds of the substance classes of fluorinated polyolefins, silicones and aramid fibers), lubricants and mold release agents (for example pentaerythritol tetrastearate), nucleating agents, antistatics, fillers and reinforcing substances (for example glass fibers or carbon fibers, mica, kaolin, talc, $CaCO_3$ and glass flakes) as well as dyestuffs and pigments. As mentioned above such conventional polymer additives may be contained in an amount of preferably up to 25 wt.-% based on the total amount of the resin composition.

The present invention further relates to a process for the manufacture of the resin composition according to the invention, comprising the steps of:

a) Preparing at least one graft rubber copolymer B) by emulsion polymerization of styrene and acrylonitrile in the weight ratio 95:5 to 50:50, whereby styrene and/or acrylonitrile wholly or partially can be replaced by copolymerizable monomers, onto at least two rubber latices, comprising: a butadiene rubber latex (B1) having a weight median particle diameter $D_{50}$ of 100 to 250 nm, and a gel content from 30 to 80% by weight, and a butadiene rubber latex (B2) having a weight median particle diameter $D_{50}$ of more than 350 nm, and a gel content of less than 75% by weight, preferably less than 70% by weight, b) Admixing the graft rubber copolymer B) obtained in step a) with at least one aromatic polycarbonate A) and optionally 0 to 50 wt.-parts of one or more (co)polymer of at least one monomer selected from the group consisting of vinyl aromatic monomers, vinyl cyanides and unsaturated carboxylic acids and derivatives thereof, optionally 0 to 25 wt.-parts of conventional polymer additives.

Preparation of the Moulding Compositions and Shaped Articles

The present invention further relates to a process for the preparation of moulding compositions and/or shaped articles from the resin composition according to the invention.

Thermoplastic molding compositions according to the invention may be prepared from the resin composition of the present invention for example by mixing the particular constituents in a known manner and subjecting the mixture to melt compounding and melt extrusion at temperatures of from 200° C. to 300° C. in conventional units, such as internal kneaders, extruders and twin-shaft screws. The mixing of the individual constituents may be carried out in a known manner either successively or simultaneously, and in particular either at about 20° C. (room temperature) or at a higher temperature. In a preferred embodiment, optional component C) or a part amount of component C) is added to component B) or a part amount of component B) to give a precompound. The present invention therefore also provides compositions wherein at least one graft rubber copolymer B) or a part amount thereof and at least one of the optional components C) or a part amount of component C) are employed in the form of a precompound prepared by compounding of them. A precompound of a graft polymer according to component B) prepared in the emulsion polymerization process and a copolymer according to component C) or a part amount of component C) is particularly preferably employed, in a preferred embodiment this precompound being prepared by mixing the two components B) and C) in the melt at temperatures of from 200 to 260° C. with application of a vacuum, in a particularly preferred embodiment, in the first step graft polymer B or a part amount of component B) is mixed with component C) or a part amount of component C) by means of compounding with vacuum devolatilization to give a low-emission precompound. It is particularly advantageous to employ component B) in the moist state (i.e. in the presence of water) in this davolatilizing compounding in accordance with the process which is described in EP 0 768 157 A1 and EP 0 867 463 A1. Precompounds in which the total content of volatile organic compounds is less than 400 mg/kg, preferably less than 300 mg/kg, in particular less than 200 mg/kg are particularly suitable. In the second process step, the remaining constituents and the precompound are mixed in a known manner and the mixture is subjected to melt compounding or melt extrusion at temperatures of from 200° C. to 300° C. in conventional units, such as internal kneaders, extruders and twin-shaft screws. In a preferred embodiment, a reduced pressure of <500 mbar, preferably <150 mbar, in particular <100 mbar is applied during this second compounding step for the purpose of further devolatilization of volatile constituents (such as e.g. residual monomers and residual solvent). The present invention therefore also provides a process for the preparation of low-emission compositions according to the invention. The molding compositions according to the invention may be used for the production of all types of shaped articles. These may be produced by injection molding, extrusion and the blow molding process. A further form of processing is the production of shaped articles by thermoforming from previously produced sheets or films. Examples of such shaped articles are films, profiles, housing parts of all types, e.g. for domestic appliances, such as juice presses, coffee machines, mixers; for office machines, such as monitors, flat screens, notebooks, printers, copiers; sheets, pipes, electrical installation conduits, windows, doors and further profiles for the construction sector (interior finishing and exterior uses) as well as electrical and electronic components, such as switches, plugs and sockets, as well as vehicle body and interior components utility vehicles, in particular for the automobile sector. The molding compositions according to the invention may also be used in particular, for example, for the production of the following shaped articles or moldings: interior finishing parts for track vehicles, ships, aircraft, busses and other motor vehicles, housings of electrical equipment containing small transformers, housings for equipment for processing and transmission of information, housings and facings for medical equipment, massage equipment and housings therefor, toy vehicles for children, flat wall elements, housings for safety equipment, thermally insulated transportation containers, moldings for sanitary and bath fittings, cover gratings for ventilator openings and housings for garden equipment.

The invention is further illustrated but is not intended to be limited by the following examples in which all parts and percentages are by weight unless otherwise specified.

EXAMPLES

For measuring the weight average particle size $D_w$ and the weight median particle diameter $D_{50}$ with the disc centrifuge DC 24000 by CPS Instruments Inc. equipped with a low density disc, an aqueous sugar solution of 17.1 mL with a density gradient of 8 to 20% by wt. of saccharose in the centrifuge disc was used, in order to achieve a stable flotation behavior of the particles. A polybutadiene latex with a narrow distribution and a particle size of 405 nm (determined by electron microscopy) was used for calibration. The measurements were carried out at a rotational speed of the disc of 24,000 r.p.m. by injecting 0.1 mL of a diluted rubber dispersion prepared in an aqueous 24% by wt. saccharose solution into the disc containing the aqueous sugar solution with a density gradient of 8 to 20% by wt. of saccharose. The calculation of the weight average particle size $D_w$ and the weight median particle diameter $D_{50}$ was performed by means of the Mie theory.

Component A)

Polycarbonate manufactured from bisphenol A and phosgene with a weight average molecular weight of 27,500 g/mol (measured by GPC in methylene chloride at 25° C.).

Component B)

Rubber Latices

Rubber Latex B1

The rubber latex B1 is produced by emulsion polymerization of butadiene using sodium rosin soap as emulsifier and by means of a butadiene seed latex with diameter $D_{50}$ of 47 nm. The final rubber latex B1 has a $D_{50}$ of 188 nm and $D_w$ of 183 nm. The gel content is 71 wt.-%.

Rubber Latex B2

The rubber latex B2 is produced by emulsion polymerization of butadiene using an emulsifier according to DE-A 39 13 509, table 1, Nr.1 and by means of a butadiene seed latex with diameter $D_{50}$ of 119 nm, The final rubber latex B2 has a $D_{50}$ of 365 nm and $D_w$ of 364 nm. The gel content is 67 wt.-%.

A 25:75 mixture by weight of B1 and B2 according to the invention (based on solids, evaporation sample at 180° C. for 25 min. in drying cabinet) has a $D_{50}$ of 361 nm and $D_w$ of 323 nm; a 50:50 mixture by weight of B1 and B2 which is not according to the invention has a $D_{50}$ of 210 nm and $D_w$ of 273 nm. The rubber latices B1 and B2 are mixed by stirring according to the weight ratios above before the measurements of the particles sizes are carried out with a disc centrifuge DC 24000 by CPS Instruments Inc.

Rubber Latex B3 (for Comparison Trials)

The rubber latex B3 is produced by emulsion polymerization of butadiene using sodium rosin soap as emulsifier and by means of a butadiene seed latex with diameter $D_{50}$ of 47 nm. The final rubber latex B3 has a $D_{50}$ of 119 nm and $D_w$ of 117 nm. The gel content is 88 wt.-%.

Rubber Latex B4 (for Comparison Trials)

The rubber latex B4 is produced by emulsion polymerization of butadiene using an emulsifier according to DE-A 39 13 509, table I, Nr.1 and by means of a butadiene seed latex with diameter $D_{50}$ of 47 nm. The final rubber latex B4 has a $D_{50}$ of 294 nm and $D_w$ of 288 nm. The gel content is 53 wt.-%.

Rubber Latex B5 (for Comparison Trials)

The rubber latex B5 is produced by emulsion polymerization of butadiene using an emulsifier according to DE-A 39 13 509, table I, Nr.1 and by means of a butadiene seed latex with diameter $D_{50}$ of 47 nm. The final rubber latex B5 has a $D_{50}$ of 294 nm and $D_w$ of 288 nm. The gel content is 71 wt.-%.

Rubber Latex B6 (for Comparison Trials)

The rubber latex B6 is produced by emulsion polymerization of butadiene using an emulsifier according to DE-A 39 13 509, table I, Nr. 1 and by means of a butadiene seed latex with diameter $D_{50}$ of 47 nm. The final rubber latex B5 has a $D_{50}$ of 376 nm and $D_w$ of 367 nm. The gel content is 79 wt.-%.

Graft Polymer B-1

A mixture of 15 wt.-parts of the rubber latex B1 and 45 wt.-parts of the rubber latex B2 corresponding to a weight ratio of B1 to B2 of 25:75—(based on solids, evaporation sample at 180° C. for 25 min. in drying cabinet) is mixed and adjusted with water to a solid content of ca. 30 wt.-% and heated to 59° C. After this 40 wt.-parts of a mixture of 74.5 wt.-% styrene and 25.5 wt.-% acrylonitrile based on the total amount of the monomers are fed continuously within 4 hours to the provided rubber latex. Starting with the monomer feed an aqueous sodium rosin soap solution is fed in 5 hours and an aqueous solution of tert-butylhydroperoxide as well as an aqueous solution of sodium ascorbate is fed in 9 hours. The temperature is increased within 4 hours from 59° C. to 81° C. and kept in the range of 78 to 81° C. for further 8 hours. The graft latex B-1 is stabilized with 0.8 wt.-% of a phenolic antioxidant and coagulated with a mixture of magnesium sulfate and acetic acid, washed with water and dried at 70° C. in a drying cabinet to obtain the graft polymer B-1 according to the invention.

Graft Polymer B-2

A mixture of 15 wt.-parts of the rubber latex B1 and 45 wt.-parts of the rubber latex B2 corresponding to a weight ratio of B1 to B2 of 25:75 (based on solids, evaporation sample at 180° C. for 25 min. in drying cabinet) is mixed and adjusted with water to a solid content of ca. 30 wt.-% and heated to 59° C. After this 40 wt.-parts of a mixture of 74.5 wt.-% styrene and 25.5 wt.-% acrylonitrile and 0.16 wt.-parts of tert.-dodecylmercaptane are fed continuously within 4 hours to the provided rubber latex. Starting with the monomer feed an aqueous sodium rosin soap solution is fed in 5 hours and an aqueous solution of tert.-butylhydroperoxide as well as an aqueous solution of sodium ascorbate is fed in 9 hours. The temperature is increased within 4 hours from 59° C. to 81° C. and kept in the range of 78 to 81° C. for further 8 hours. The graft latex B-2 is stabilized with 0.8 wt.-% of a phenolic antioxidant and coagulated with a mixture of magnesium sulfate and acetic acid, washed with water and dried at 70° C. in a drying cabinet. Graft polymer B-2 according to the invention is obtained.

Graft Polymer B-3

In a similar way to the graft latex B-1 a mixture of 15 wt.-parts of the rubber latex B1 and 45 wt.-parts of the rubber latex B2 corresponding to a weight ratio of B1 to B2 of 25:75—(based on solids, evaporation sample at 180° C. for 25 min. in drying cabinet) is mixed and adjusted with water to a solid content of ca. 30 wt.-% and heated to 59° C. After this 40 wt.-parts of a mixture of 74.5 wt.-% styrene and 25.5 wt.-% acrylonitrile are fed continuously within 4 hours to the provided rubber latex, Starting with the monomer feed an aqueous sodium rosin soap solution is fed in 5 hours and an aqueous solution of potassium persulfate as well as an aqueous solution of Brueggolite®FF6 M from Brueggemann Chemical as reducing agent is fed in 8 hours. The temperature is increased within 4 hours from 59° C. to 81° C. and kept in the range of 78 to 81° C. for further 8 hours. The graft latex B-3 is stabilized with 0.8 wt.-% of a phenolic antioxidant and coagulated with a mixture of magnesium sulfate and acetic acid, washed with water and dried at 70° C. in a drying cabinet. Graft polymer B-3 according to the invention is obtained.

Graft Polymer B-4

In a similar way to B-3 a mixture of 15 wt.-parts of the rubber latex B1 and 45 wt.-parts of the rubber latex B2 corresponding to a weight ratio of B1 to B2 of 25:75 (based on solids, evaporation sample at 180° C. for 25 min. in drying cabinet) is mixed and adjusted with water to a solid content of ca 30 wt.-% and heated to 59° C. After this 40 wt.-parts of a mixture of 74.5 wt.-% styrene and 25.5 wt.-% acrylonitrile and 0.16 wt.-parts of tert.-dodecylmercaptane are fed continuously within 4 hours to the provided rubber latex. Starting with the monomer feed an aqueous sodium rosin soap solution is fed in 5 hours and an aqueous solution of potassium persulfate as well as an aqueous solution of Brueggolite®FF6 M from Brueggemann Chemical as reducing agent is fed in 8 hours. The temperature is increased within 4 hours from 59° C. to 81° C. and kept in the range of 78 to 81° C. for further 8 hours. The graft latex B-4 is stabilized with 0.8 wt.-% of a phenolic antioxidant and coagulated with a mixture of magnesium sulfate and acetic acid, washed with water and dried at 70° C. in a drying cabinet. Graft polymer B-4 according to the invention is obtained.

Graft Polymer B-5 (for Comparison Trials)

A mixture of 30 wt.-parts of the rubber latex B1 and 30 wt.-parts of the rubber latex B2 corresponding to a weight ratio of 50:50 ($D_{50}$=210 nm) (based on solids, evaporation sample at 180° C. for 25 min. in drying cabinet) is mixed and adjusted with water to a solid content of ca. 30 wt.-% and heated to 59° C. After this 40 wt.-parts of a mixture of 74.5 wt.-% styrene and 25.5 wt.-% acrylonitrile are fed continuously within 4 hours to the provided rubber latex. Starting with the monomer feed an aqueous sodium rosin soap solution is fed in 5 hours and an aqueous solution of tert.-butylhydroperoxide as well as an aqueous solution of sodium ascorbate is fed in 9 hours. The temperature is increased within 4 hours from 59° C. to 81° C. and kept in the range of 78 to 81° C. for further 8 hours, The graft latex B-5 is stabilized with 0.8 wt.-% of a phenolic antioxidant and coagulated with a mixture of magnesium sulfate and acetic acid, washed with water and dried at 70° C. in a drying cabinet to obtain the graft polymer B-5.

Graft Polymer B-6 (for Comparison Trials)

60 wt.-parts of the rubber latex B1 (based on solids, evaporation sample at 180° C. for 25 min. in drying cabinet) is adjusted with water to a solid content of ca. 30 wt.-% and heated to 59° C. After this 40 wt.-parts of a mixture of 74.5 wt.-% styrene and 25.5 wt.-% acrylonitrile are fed continuously within 4 hours to the provided rubber latex. Starting with the monomer feed an aqueous sodium rosin soap solution is fed in 5 hours and an aqueous solution of tert.-butylhydroperoxide as well as an aqueous solution of sodium ascorbate is fed in 9 hours. The temperature is increased within 4 hours from 59° C. to 81° C. and kept in the range of 78 to 81° C. for further 8 hours. The graft latex B-6 is stabilized with 0.8 wt.-% of a phenolic antioxidant and coagulated with a mixture of magnesium sulfate and acetic acid, washed with water and dried at 70° C. in a drying cabinet to obtain the graft polymer B-6.

Graft Polymer B-7 (for Comparison Trials)

60 wt.-parts of the rubber latex B2 (based on solids, evaporation sample at 180° C. for 25 min. in drying cabinet) is adjusted with water to a solid content of ca. 30 wt.-% and heated to 59° C. After this 40 wt.-parts of a mixture of 74.5 wt.-% styrene and 25.5 wt.-% acrylonitrile are fed continuously within 4 hours to the provided rubber latex. Starting with the monomer feed an aqueous sodium rosin soap solution is fed in 5 hours and an aqueous solution of tert.-butylhydroperoxide as well as an aqueous solution of sodium ascorbate is fed in 9 hours. The temperature is increased within 4 hours from 59° C. to 81° C. and kept in the range of 78 to 81° C. for further 8 hours. The graft latex B-7 is stabilized with 0.8 wt.-% of a phenolic antioxidant and coagulated with a mixture of magnesium sulfate and acetic acid, washed with water and dried at 70° C. in a drying cabinet to obtain the graft polymer B-7.

Graft Polymer B-8 (for Comparison Trials)

A mixture of 30 wt.-parts of the rubber latex B1, 15 wt.-parts of the rubber latex B2 (D50 of the mixture of B1 and B2<210 nm) and 15 wt.-parts of the rubber latex B5 (based on solids, evaporation sample at 180° C. for 25 min. in drying cabinet) is mixed and adjusted with water to a solid content of ca. 30 wt.-% and heated to 59° C. After this 40 wt.-parts of a mixture of 74.5 wt.-% styrene and 25.5 wt.-% acrylonitrile are fed continuously within 4 hours to the provided rubber latex. Starting with the monomer feed an aqueous sodium rosin soap solution is fed in 5 hours and an aqueous solution of tert.-butylhydroperoxide as well as an aqueous solution of sodium ascorbate is fed in 9 hours. The temperature is increased within 4 hours from 59° C. to 81° C. and kept in the range of 78 to 81° C. for further 8 hours. The graft latex B-8 is stabilized with 0.8 wt.-% of a phenolic antioxidant and coagulated with a mixture of magnesium sulfate and acetic acid, washed with water and dried at 70'C. in a drying cabinet to obtain the graft polymer B-8.

Graft Polymer B-9 (for Comparison Trials)

60 wt.-parts of the rubber latex B3 (based on solids, evaporation sample at 180° C. for 25 min. In drying cabinet) is adjusted with water to a solid content of ca. 30 wt.-% and heated to 59° C. After this 40 wt.-parts of a mixture of 74.5 wt.-% styrene and 25.5 wt.-% acrylonitrile are fed continuously within 4 hours to the provided rubber latex. Starting with the monomer feed an aqueous sodium rosin soap solution is fed in 5 hours and an aqueous solution of tert.-butylhydroperoxide as well as an aqueous solution of sodium ascorbate is fed in 9 hours, The temperature is increased within 4 hours from 59° C. to 81° C. and kept in the range of 78 to 81° C. for further 8 hours. The graft latex B-10 is stabilized with 0.8 wt.-% of a phenolic antioxidant and coagulated with a mixture of magnesium sulfate and acetic acid, washed with water and dried at 70° C. in a drying cabinet to obtain the graft polymer B-9.

Graft Polymer B-10 (for Comparison Trials)

A mixture of 15 wt.-parts of the rubber latex B4 and 45 wt.-parts of the rubber latex B6 (based on solids, evaporation sample at 180° C. for 25 min. in drying cabinet) is mixed and adjusted with water to a solid content of ca. 30 wt.-% and heated to 59° C. After this 40 wt.-parts of a mixture of 74.5 wt.-% styrene and 25.5 wt.-% acrylonitrile are fed continuously within 4 hours to the provided rubber latex. Starting with the monomer feed an aqueous sodium rosin soap solution is fed in 5 hours and an aqueous solution of tert.-butylhydroperoxide as well as an aqueous solution of sodium ascorbate is fed in 9 hours. The temperature is increased within 4 hours from 59° C. to 81° C. and kept in the range of 78 to 81° C. for further 8 hours. The graft latex B-11 is stabilized with 0.8 wt.-% of a phenolic antioxidant and coagulated with a mixture of magnesium sulfate and acetic acid, washed with water and dried at 70° C. in a drying cabinet to obtain the graft polymer B-10.

Graft Polymer B-11 (for Comparison Trials)

A mixture of 15 wt.-parts of the rubber latex B1 and 45 wt.-parts of the rubber latex B6 (based on solids, evaporation sample at 180° C. for 25 min. in drying cabinet) is mixed and adjusted with water to a solid content of ca. 30 wt.-% and heated to 59° C. After this 40 wt.-parts of a mixture of 74.5 wt.-% styrene and 25.5 wt.-% acrylonitrile are fed continuously within 4 hours to the provided rubber latex. Starting with the monomer feed an aqueous sodium rosin soap solution is fed in 5 hours and an aqueous solution of tert.-butyl-hydroperoxide as well as an aqueous solution of sodium ascorbate is fed in 9 hours. The temperature is increased within 4 hours from 59° C. to 81° C. and kept in the range of 78 to 81° C. for further 8 hours. The graft latex B-12 is stabilized with 0.8 wt.-% of a phenolic antioxidant and coagulated with a mixture of magnesium sulfate and acetic acid, washed with water and dried at 70° C. in a drying cabinet to obtain the graft polymer B-11.

Graft Polymer B-12 (for Comparison Trials)

A mixture of 18 wt.-parts of the rubber latex B3 and 42 wt.-parts of the rubber latex B2 (based on solids, evaporation sample at 180° C. for 25 min. in drying cabinet) is mixed and adjusted with water to a solid content of ca. 30 wt.-% and heated to 59'C. After this 40 wt.-parts of a mixture of 74.5 wt.-% styrene and 25.5 wt.-% acrylonitrile are fed continuously within 4 hours to the provided rubber latex. Starting with the monomer feed an aqueous sodium rosin soap solution is fed in 5 hours and an aqueous solution of tert.-butyl-hydroperoxide as well as an aqueous solution of sodium ascorbate is fed in 9 hours. The temperature is increased within 4 hours from 59° C. to 81° C. and kept in the range of 78 to 81° C. for further 8 hours. The graft latex B-13 is stabilized with 0.8 wt.-% of a phenolic antioxidant and coagulated with a mixture of magnesium sulfate and acetic acid, washed with water and dried at 70° C. in a drying cabinet to obtain the graft polymer B-12.

Component C-1

Statistical copolymer from styrene and acrylonitrile with a ratio of polymerized styrene to acrylonitrile of 76.5:23.5 with a weight average molecular weight Mw of ca. 145,000 g/mol, a polydispersity of $M_w/M_n<3$ and a melt flow rate (MVR) at 220° C./10 kg of 40 mL/10 minutes, produced by free radical solution polymerization.

Additives

D1: Pentaerythrityl tetrastearate
D2: Phosphite stabilizer Irganox® B900 from BASF
D3: Phenolic antioxidans Irganox® 1076 from BASF
D4: citric acid

EXAMPLES

The PC/ABS compounds are mixed on a twin-screw-extruder with a shaft diameter of 25 mm. The temperature zones in the extruder were set to 220° C. to 250° C. (extrusion zone) and the twin-screw-extruder was processed at 480 rpm, The batch size for all examples was 4 kg.

In the following tables the compositions in wt.-part and the test results are summarized.

The following tests were performed with the thermoplastic resins: melt volume rate MVR at 260° C. and 5 kg load [mL/10 min] according to ISO 1133, ball indentation (Hc) [N/mm$^2$] according to ISO 2039-1 (test load 358 N, test duration 30 sec.), notched Izod impact strength [kJ/m$^2$] according to ISO 180-1A at different temperatures, Vicat softening temperatures B/120 (50N, 120° C./h) according to ISO 306. The hydrolytic stability is tested by change of the MVR at 260° C. and 5 kg load [mL/10 min] according to ISO 1133 after storage of the pellets at 95° C. and 100% relative humidity. The increase of the MVR is reported in [mL/10 min]. The processing stability is tested by measuring the MVR at 300° C. and 5 kg load [mL/10 min] according to ISO 1133 after the melt was stored for 15 min under the absence of oxygen. Lower values of the hydrolytic and processing stability result in better stability.

| | Example | | | | | | | | | | |
|---|---|---|---|---|---|---|---|---|---|---|---|
| | 1 Inventive example | 2 Inventive example | 3 Inventive example | 4 Inventive example | 5 comparative example | 6 comparative example | 7 comparative example | 8 comparative example | 9 comparative example | 10 comparative example | 11 comparative example |
| Component A | 43 | 43 | 43 | 43 | 43 | 43 | 43 | 43 | 43 | 43 | 43 |
| Graft polymer B-1 | 25.5 | | | | | | | | | | |
| Graft polymer B-2 | | 25.5 | | | | | | | | | |
| Graft polymer B-3 | | | 25.5 | | | | | | | | |
| Graft polymer B-4 | | | | 25.5 | | | | | | | |
| Graft polymer B-5 | | | | | 25.5 | | | | | | |
| Graft polymer B-6 | | | | | | 6.38 | | | | | |
| Graft polymer B-7 | | | | | | 19.12 | | | | | |
| Graft polymer B-8 | | | | | | | 25.5 | | | | |
| Graft polymer B-9 | | | | | | | | 6.38 | | | |
| Graft polymer B-10 | | | | | | | | 19.12 | 25.5 | | |
| Graft polymer B-11 | | | | | | | | | | 25.5 | |
| Graft polymer B-12 | | | | | | | | | | | 25.5 |
| Component C-1 | 31.5 | 31.5 | 31.5 | 31.5 | 31.5 | 31.5 | 31.5 | 31.5 | 31.5 | 31.5 | 31.5 |
| Component D1 | 0.75 | 0.75 | 0.75 | 0.75 | 0.75 | 0.75 | 0.75 | 0.75 | 0.75 | 0.75 | 0.75 |
| Component D2 | 0.12 | 0.12 | 0.12 | 0.12 | 0.12 | 0.12 | 0.12 | 0.12 | 0.12 | 0.12 | 0.12 |
| Component D3 | 0.10 | 0.10 | 0.10 | 0.10 | 0.10 | 0.10 | 0.10 | 0.10 | 0.10 | 0.10 | 0.10 |

|  | 3 | 4 | 5 | 6 | 7 | 8 | 9 | 10 | 11 | 12 |
|---|---|---|---|---|---|---|---|---|---|---|
| notched Izod impact strength |  |  |  |  |  |  |  |  |  |  |
| @ RT [kJ/m$^2$] | 40.8 | 44.6 | 45.2 | 45.2 | 41.6 | 40.9 | 41.1 | 33.9 | 38.4 | 36.3 | 39.7 |
| @ −30° C. [kJ/m$^2$] | 32.9 | 36.7 | 37.2 | 36.1 | 32.8 | 32.4 | 31.8 | 28.9 | 29.1 | 36.3 | 35.7 |
| @ −40° C. [kJ/m$^2$] | 34.1 | 39.4 | 35.2 | 34.9 | 31.8 | 31.0 | 29.7 | 21.4 | 23.8 | 24.4 | 32.5 |
| Vicat B/120 [° C.] | 110 | 106 | 110.3 | 110 | 110 | 111 | 109 | 108 | 110 | 110 | 108 |
| MVR 260° C./5 kg [mL/10 min] | 8.7 | 19.9 | 14.3 | 15.5 | 8.7 | 9.3 | 10.5 | 10.0 | 15.8 | 15.5 | 7.8 |
| ball indentation (Hc) [N/mm$^2$] | 87 | 85 | 94 | 95 | 108 | 87 | 86 | 85 | 93 | 87 | 84 |
| Hydrolytic stability Delta MVR [mL/10 min] | 7.2 | — (nd) | 9.7 | 10.5 | 5.8 | 5.4 | 6.5 | 7.7 | 12.1 | 12.2 | 6.6 |
| Processing stability MVR 300° C./5 kg [mL/10 min] | 75 | — (nd) | 72 | 87 | 49 | 62 | 41 | 50 | 86 | 90 | 34 |

|  | Example |  |  |  |  |  |  |  |  |  |  |
|---|---|---|---|---|---|---|---|---|---|---|---|
|  | 12 Inventive example | 13 comparative example | 14 comparative example | 15 Inventive example | 16 comparative example | 17 comparative example | 18 comparative example | 19 comparative example | 20 comparative example | 21 comparative example | 22 comparative example |
| Component A | 58 | 58 | 58 | 70 | 70 | 70 | 70 | 70 | 70 | 70 | 70 |
| Graft polymer t B-1 | 18.75 |  |  | 13.5 |  |  |  |  |  |  |  |
| Graft polymer B-5 |  | 18.75 |  |  | 13.5 |  |  |  |  |  |  |
| Graft polymer B-6 |  |  | 4.89 |  |  | 3.38 |  |  |  |  |  |
| Graft polymer B-7 |  |  | 14.06 |  |  | 10.12 |  |  |  |  |  |
| Graft polymer B-8 |  |  |  |  |  |  | 13.5 |  |  |  |  |
| Graft polymer B-9 |  |  |  |  |  |  |  | 3.375 |  |  |  |
| Graft polymer B-10 |  |  |  |  |  |  |  | 10.125 | 13.5 |  |  |
| Graft polymer B-11 |  |  |  |  |  |  |  |  |  | 13.5 |  |
| Graft polymer B-12 |  |  |  |  |  |  |  |  |  |  | 13.5 |
| Component C-1 | 32.25 | 32.25 | 32.25 | 16.5 | 16.5 | 16.5 | 16.5 | 16.5 | 16.5 | 16.5 | 16.5 |
| Component D1 | 0.75 | 0.75 | 0.75 | 0.75 | 0.75 | 0.75 | 0.75 | 0.75 | 0.75 | 0.75 | 0.75 |
| Component D2 | 0.12 | 0.12 | 0.12 | 0.12 | 0.12 | 0.12 | 0.12 | 0.12 | 0.12 | 0.12 | 0.12 |
| Component D3 | 0.10 | 0.10 | 0.10 | 0.10 | 0.10 | 0.10 | 0.10 | 0.10 | 0.10 | 0.10 | 0.10 |
| Component D4 | 0.10 | 0.10 | 0.10 | 0.10 | 0.10 | 0.10 | 0.10 | 0.10 | 0.10 | 0.10 | 0.10 |
| notched Izod impact strength |  |  |  |  |  |  |  |  |  |  |  |
| @ RT [kJ/m$^2$] | 46.8 | 47.2 | 46.9 | 52.0 | 51.8 | 53.4 | 45.2 | 46.8 | 48.6 | 45.8 | 46.8 |
| @ −30° C. [kJ/m$^2$] | 37.3 | 38.4 | 37.2 | 40.9 | 40.1 | 40.5 | 27.6 | 34.1 | 41.1 | 30.2 | 41.2 |
| @ −40° C. [kJ/m$^2$] | 37.3 | 36.2 | 35.8 | 45.7 | 34.3 | 37.0 | 23.4 | 25.1 | 26.3 | 24.1 | 24.2 |
| Vicat B/120 [° C.] | 120 | 121 | 121 | 131 | 131 | 132 | 127 | 128 | 130 | 129 | 126 |
| MVR 260° C./5 kg [mL/10 min] | 10.7 | 9.8 | 10.9 | 11.2 | 11.9 | 11.7 | 16.8 | 16.3 | 17.5 | 17.7 | 16.0 |
| ball indentation (Hc) [N/mm$^2$] | 98 | 99 | 98 | 104 | 105 | 104 | 103 | 102 | 103 | 103 | 99 |
| Hydrolytic stability Delta MVR [mL/10 min] | 10.0 | 10.0 | 9.7 | — | — | — | — | — | — | — | — |

The invention claimed is:

1. Resin composition comprising a homogenous blend of:
A) 5 to 99 wt.-parts of at least one aromatic polycarbonate,
B) 1 to 95 wt.-parts of at least one graft rubber copolymer which is produced by:
emulsion polymerization of styrene and acrylonitrile in the weight ratio 95:5 to 50:50, whereby styrene and/or acrylonitrile wholly or partially can be replaced by copolymerizable monomers, onto at least two rubber latices, comprising:
a butadiene rubber latex (B1) having a weight median particle diameter $D_{50}$ of 100 to 250 nm, and a gel content from 30 to 80% by weight, and
a butadiene rubber latex (B2) having a weight median particle diameter $D_{50}$ of more than 350 nm, and a gel content of less than 75% by weight,
C) optionally 0 to 50 wt.-parts of one or more (co)polymer of at least one monomer selected from the group consisting of vinyl aromatic monomers, vinyl cyanides and unsaturated carboxylic acids and derivatives thereof,
D) optionally 0 to 25 wt.-parts of conventional polymer additives, wherein
the weight median particle diameter $D_{50}$ of the mixture of the butadiene rubber latices (B1) and (B2) is larger than 350 nm and is less than 1000 nm, and the amount of the butadiene rubber latex polymer (B1) in the graft rubber copolymer B) is 1 to 49% by weight (B1) and the amount of the butadiene rubber latex polymer (B2) is 51 to 99% by weight, based on the total weight of the rubber latex polymers in the graft rubber copolymer B).

2. Resin composition according to claim 1, wherein the rubber latices of graft rubber copolymer B) consist of butadiene rubber latex polymer (B1) and butadiene rubber latex polymer (B2).

3. Resin composition according to claim 1, wherein the butadiene rubber latex polymer (B1) has a weight median particle diameter $D_{50}$ of 150 to 220 nm and/or has a gel content from 60 to 80% by weight.

4. Resin composition according to claim 1, wherein the butadiene rubber latex polymer (B2) has a weight median particle diameter $D_{50}$ of 360 to 450 nm, and/or has a gel content of less than 70% by weight.

5. Resin composition according to claim 1, wherein the graft rubber copolymer B) is produced by common grafting onto a mixture of the at least two rubber lattices, comprising said a butadiene rubber latex (B1) and (B2).

6. Resin composition according to claim 1, wherein the graft rubber copolymer B) is produced by grafting of styrene and acrylonitrile onto the butadiene rubber lattices.

7. Resin composition according to claim 1, wherein the graft rubber copolymer B) is produced by grafting of 30 to 50 parts by weight styrene and acrylonitrile onto 50 to 70 parts by weight of the butadiene rubber latices.

8. Resin composition according to claim 1, wherein the aromatic polycarbonate is a polycarbonate based on bisphenol A and phosgene.

9. Resin composition according to claim 1, which comprises at least one said (co)polymer C).

10. Resin composition according to claim 1, which comprises at least one said (co)polymer C) which is a copolymer of styrene and acrylonitrile.

11. Resin composition according to claim 1, wherein the conventional polymer additive (component D) is selected from the group of stabilizers, flame retarding agents, flameproofing synergists, antidripping agents, lubricants and mold release agents, nucleating agents, antistatics, fillers and reinforcing substances, dyestuffs and pigments.

12. Resin composition according to claim 1, comprises comprising
    A) 30 to 80 wt.-% of said at least one aromatic polycarbonate,
    B) 5 to 30 wt.-% of said at least one graft rubber copolymer, and
    C) 10 to 40 wt.-% of said one or more (co)polymer, and optionally 0 to 25 wt.-% of said conventional polymer additives D), the weight-percentages being based on the total weight of the resin composition.

13. Process for the manufacture of the resin composition according to claim 1, comprising the steps of:
    a) preparing at least one graft rubber copolymer B) by emulsion polymerization of styrene and acrylonitrile in the weight ratio 95:5 to 50:50, whereby styrene and/or acrylonitrile wholly or partially can be replaced by copolymerizable monomers, onto at least two rubber latices, comprising: a butadiene rubber latex (B1) having a weight median particle diameter $D_{50}$ of 100 to 250 nm, and a gel content from 30 to 80% by weight, and a butadiene rubber latex (B2) having a weight median particle diameter $D_{50}$ of more than 350 nm, and a gel content of less than 75% by weight, and
    b) admixing the graft rubber copolymer B) obtained in step a) with at least one aromatic polycarbonate A) and optionally 0 to 50 wt.-parts of one or more (co) polymer of at least one monomer selected from the group consisting of vinyl aromatic monomers, vinyl cyanides and unsaturated carboxylic acids and derivatives thereof, optionally 0 to 25 wt.-parts of conventional polymer additives.

14. A method for the manufacture of shaped or molded articles, comprising the steps of:
    (i) providing a molding composition comprising the resin composition according to claim 1, and
    (ii) shaping or molding said molding composition.

15. Shaped or molded articles, comprising the resin composition according to claim 1.

16. Resin composition according to claim 2, wherein the butadiene rubber latex polymer (B1) has a weight median particle diameter $D_{50}$ of 150 to 220 nm and/or has a gel content from 60 to 80% by weight.

17. Resin composition according to claim 16, wherein the butadiene rubber latex polymer (B2) has a weight median particle diameter $D_{50}$ of 360 to 450 nm, and/or has a gel content of less than 70% by weight.

18. Resin composition according to claim 3, wherein the butadiene rubber latex polymer (B2) has a weight median particle diameter $D_{50}$ of 360 to 450 nm, and/or has a gel content of less than 70% by weight.

19. Resin composition according to claim 2, wherein the butadiene rubber latex polymer (B2) has a weight median particle diameter $D_{50}$ of 360 to 450 nm, and/or has a gel content of less than 70% by weight.

20. Resin composition according to claim 17, wherein the graft rubber copolymer B) is obtained by common grafting onto a mixture of the at least two rubber lattices, comprising said a butadiene rubber latex (B1) and (B2).

21. The method according to claim 14, wherein the shaping or molding of the molding composition in step (ii) is performed by an injection molding, extrusion or blow molding process or by thermoforming of previously produced sheets or films.

22. Resin composition according to claim 6, wherein the graft rubber copolymer B) is produced by grafting of 60 to 90% by weight styrene and 10 to 40% by weight acrylonitrile onto the butadiene rubber latices, the weight percentages relating to the total weight of styrene and acrylonitrile.

* * * * *